(12) United States Patent
Talon et al.

(10) Patent No.: US 10,921,179 B2
(45) Date of Patent: Feb. 16, 2021

(54) ASSEMBLY FOR TURBINE ENGINE FOR MEASURING VIBRATIONS SUSTAINED BY A ROTATING BLADE

(71) Applicant: SAFRAN HELICOPTER ENGINES, Bordes (FR)

(72) Inventors: Arnaud Talon, Espoey (FR); Gilbert Arrouge, Ogeu les Bains (FR); Jean-Yves Cazaux, Artiguelouve (FR); Julien Garnier, Jurancon (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 607 days.

(21) Appl. No.: 15/107,533

(22) PCT Filed: Dec. 22, 2014

(86) PCT No.: PCT/FR2014/053515
§ 371 (c)(1),
(2) Date: Jun. 23, 2016

(87) PCT Pub. No.: WO2015/097399
PCT Pub. Date: Jul. 2, 2015

(65) Prior Publication Data
US 2016/0320230 A1 Nov. 3, 2016

(30) Foreign Application Priority Data

Dec. 23, 2013 (FR) .................................... 1363471

(51) Int. Cl.
*G01H 1/00* (2006.01)
*G01P 3/487* (2006.01)
(Continued)

(52) U.S. Cl.
CPC .............. *G01H 1/006* (2013.01); *F01D 5/02* (2013.01); *F01D 5/12* (2013.01); *F01D 21/003* (2013.01);
(Continued)

(58) Field of Classification Search
CPC .. G01H 1/006; F01D 5/02; F01D 5/12; F01D 21/003; F01D 25/24; G01P 3/487; F05D 2220/30; F05D 2240/307
See application file for complete search history.

(56) References Cited

U.S. PATENT DOCUMENTS 2,575,710 A * 11/1951 Hardigg ................. F01D 21/04
310/25
3,208,269 A * 9/1965 Eccles ..................... F16C 33/34
310/156.08
(Continued)

FOREIGN PATENT DOCUMENTS

FR 2 956 206 A1 8/2011
GB 1 204 627 A 9/1970

OTHER PUBLICATIONS

French Preliminary Search Report and Written Opinion dated Sep. 11, 2014 in Patent Application No. FR1363471 filed Dec. 23, 2013 (with English translation of categories of cited documents).
(Continued)

*Primary Examiner* — Brian P Wolcott
*Assistant Examiner* — Aye S Htay
(74) *Attorney, Agent, or Firm* — Obion, McClelland, Maier & Neustadt, L.L.P.

(57) ABSTRACT

An assembly for a turbine engine, the assembly including a casing and an impeller rotatably movable inside the casing, the impeller including at least one blade having a tip edge opposite the casing, wherein the tip edge includes a magnet and wherein the casing includes an electrical conductor
(Continued)

suitable for generating between the terminals thereof an electric voltage induced by the magnet of the tip edge opposite same and representing vibrations sustained by the tip edge of the blade when the impeller is rotated.

12 Claims, 6 Drawing Sheets

(51) Int. Cl.
    *F01D 5/02*     (2006.01)
    *F01D 5/12*     (2006.01)
    *F01D 21/00*     (2006.01)
    *F01D 25/24*     (2006.01)

(52) U.S. Cl.
    CPC .............. *F01D 25/24* (2013.01); *G01P 3/487* (2013.01); *F05D 2220/30* (2013.01); *F05D 2240/307* (2013.01)

(56) References Cited

U.S. PATENT DOCUMENTS

| | | | | |
|---|---|---|---|---|
| 4,737,709 A * | 4/1988 | Loftus | ...................... | G01B 7/14 324/207.15 |
| 4,757,717 A * | 7/1988 | Wolfinger | .............. | G01H 1/003 324/207.25 |
| 4,825,166 A * | 4/1989 | MacGugan | .......... | G01R 33/045 29/606 |
| 5,206,816 A * | 4/1993 | Hill | ........................ | G01H 1/006 702/56 |
| 5,450,760 A * | 9/1995 | Lew | ........................ | G01F 1/106 73/861.02 |
| 5,821,410 A * | 10/1998 | Xiang | .................... | G01Q 60/22 73/105 |
| 2001/0043715 A1* | 11/2001 | Geisenberger | ......... | H04R 9/025 381/412 |
| 2007/0205529 A1* | 9/2007 | May | .......................... | B03C 1/22 264/173.16 |
| 2008/0206057 A1* | 8/2008 | Twerdochlib | ........... | F01D 5/225 416/190 |
| 2010/0045273 A1 | 2/2010 | Rokicki et al. | | |
| 2010/0150730 A1* | 6/2010 | Sellars | .................. | F01D 11/122 416/241 R |
| 2011/0012041 A1* | 1/2011 | De Santis | ........... | F16K 31/0675 251/129.15 |
| 2013/0236293 A1* | 9/2013 | Adaickalasamy | ........ | F01D 9/04 415/139 |
| 2013/0247671 A1* | 9/2013 | Nakayama | ................ | F01D 5/16 73/579 |
| 2015/0291397 A1* | 10/2015 | Molteni | .................... | B66C 1/06 294/65.5 |
| 2016/0116540 A1* | 4/2016 | Zheng | .................. | H01M 12/08 324/322 |

OTHER PUBLICATIONS

International Search Report and Written Opinion dated May 12, 2015 in PCT/FR2014/053515 (English translation previously filed).
International Search Report dated May 12, 2015, in PCT/FR2014/053515 filed Dec. 22, 2014.

* cited by examiner

ASSEMBLY FOR TURBINE ENGINE FOR MEASURING VIBRATIONS SUSTAINED BY A ROTATING BLADE

GENERAL FIELD

The invention relates to the field of rotatably movable blades.

The invention relates more particularly to the field of characterization of vibrations which such blades sustain when set in rotation.

PRIOR ART

An impeller is a hub comprising a plurality of blades, or vanes. During design and certification of turbine engines, it is necessary to verify whether such a rotatably movable impeller in a casing has suitable frequencies likely to be excited in the field of operation of the motor of such turbine engines.

It is also necessary to quantify the levels of associated vibratory restrictions for suitable modes identified in this field of operation.

A first known technique for characterizing vibrations sustained by blades in operation consists of the use of deformation gauges stuck to the impeller. It is possible to characterize the blades in the frequency domain and calculate the constraints within the material from measuring micro-deformations at the surface of the material.

However, this first technique comprises many disadvantages.

First, the gauges stuck to the vanes are subjected to huge centrifugal forces (of the order of 100,000 g) potentially associated with very high temperatures, especially when the instrumentation is done on a high-pressure turbine. The shelf life of gauges is consequently limited.

Second, placing the gauge requires substantial knowhow, minutiae and time (especially for the firing of cements in which the gauges are set).

Third, it is necessary to have the signal coming from the gauges embedded in the movable impeller transit to a fixed marker. For this, connecting wires on the motor shaft must lead to a turning collector. Apart from the length of the wires and the turning connection of the collector, generating noise measurements, preliminary studies for integration of a turning collector on a motor are long and costly.

A second technique based on the use of probes positioned facing the rotating vanes, and therefore in a fixed marker, has been proposed to eliminate these disadvantages.

This second technique makes a measurement of the time passage spreads before the optical probes for two vibratory states of a vane (in the presence or not of vibrations). Such a measuring method, called "tip timing", recalculates amplitudes of alternated shifts at the vane tip. The knowledge of mode shapes puts the levels of shift at the tip of vane in relation to the levels of constraints in the vane.

This method of "tip timing" described in documents U.S. Pat. Nos. 3,208,269 and 4,757,717 especially uses conductors having a zigzag shape and arranged around the axis of rotation of the vane.

This second technique however does not produce frequency information on the vibrations measured. Because of the zigzag shape of the conductors used, only overall levels of shifts at the vane tip are in fact identifiable by this second technique without knowing which vane mode is excited. For vibratory monitoring purposes, this limitation can be widely penalizing.

Also, the "tip timing" process sometimes has ambiguities disallowing identification of the order of excitation responsible for the levels of recorded shifts.

PRESENTATION OF THE INVENTION

The invention therefore aims to allow characterization of vibrations sustained by a vane when set in rotation, especially measuring information representing vibration frequencies of the vane.

According to a first aspect, an assembly for turbine engine is therefore proposed, the assembly comprising a casing and an impeller rotatably movable in the casing, the impeller comprising at least one vane having a tip facing the casing, the assembly being characterized in that the tip comprises a magnet and in that the casing comprises an electrical conductor adapted to generate between its terminals an electrical voltage induced by the magnet of the facing tip and representative of vibrations sustained by the tip of the vane when the impeller is set in rotation.

According to a second aspect, a method of characterizing vibrations of a vane of an assembly for turbine engine according to the first aspect is also proposed, the method comprising the steps of:
  setting in rotation of the impeller in the casing,
  measuring at the terminals of the electrical conductor of an electrical voltage induced by the magnet contained in the tip of the vane facing the casing,
  determining information representative of the vibrations sustained by the tip of the vane from the measured electrical voltage.

The magnet generates a magnetic field. When the rotatably movable impeller is set in rotation relative to the casing, the relative movement of the magnetic field relative to the electrical conductor (movement due to rotation of the impeller and its vibrations) induces electric current in the electrical conductor in the casing located facing the tip of the vane which comprises the magnet. This electric current spreads as far as the terminals of the electrical conductor. The voltage at these terminals characterizes the vibrations sustained by the vane, especially identifies frequencies of suitable modes of the vane.

The assembly for turbine engine according to the first aspect, and the method according to the second aspect overcome direct measurements of constraints on the impeller, and avoid heavy instrumentation in the movable marker linked to the vane, to characterize the vibrations of the vane fitted with the magnet. The instrumentation is minimum in this movable marker (just one magnet is integrated into the vane) and also minimum in the fixed marker linked to the casing (insertion of an electrical conductor on the casing) to get information equivalent to that obtained by way of the devices of the prior art described in the introduction.

The voltage measured at the terminals of the electrical conductor is representative of the vibrations of the magnet made outside the path plane, but this voltage is independent of the rotary movement of the vane around its axis of rotation (so, in a perfect situation in which the vane would not be subject to any vibration, the voltage at the terminals of the electrical conductors when the magnet is facing a portion of the central part would be zero).

Also, the fact that the central part of the conductor is over its entire length in the path plane of the magnet produces continuous signal voltage over time usable for analysis in the frequency domain. On the contrary, the zigzag conductors used in the methods of the prior art produce only fragmented and segmented signals, unsuitable for spectral analysis.

The assembly according to the first aspect can be completed by the following characteristics, taken singly or in any of their technically possible combinations.

The central part extending around the axis of rotation of the impeller can comprise two ends located at different angular positions around the axis of rotation of the impeller. Such an embodiment acquires vibration information for different angular positions of the vane around the axis of rotation of the impeller; also, the different angular positions of the two ends of the central part create discontinuity to produce "turn peaks" which can act as time reference during continuous measuring made at the terminals of the electrical conductor.

The central part can also extend over fewer than 360 degrees around the axis of rotation especially to simplify mounting of the electrical conductor on or in the casing. In such an embodiment, in which the length of the central part is shortened, a space not covered by the electrical conductor is left around the axis of rotation of the impeller between the ends of its central part. This space, also called "turn opening".

The central part and the two branches can be coplanar, each branch extending from a respective end radially to the outside relative to the axis of rotation of the impeller.

The magnet can further be adapted to emit a magnetic field radially oriented relative to the axis of rotation of the impeller.

The voltages at the terminals of the electrical conductors are generally low. Also, a voltage amplifier can be connected to the terminals of the electrical conductor, with measurements being made at the output of this amplifier.

The electrical conductor can be embedded at least partially in an abradable deposit located on an internal surface of the casing facing the impeller, the abradable deposit being made of paramagnetic or diamagnetic material. In this way, the magnetic flow of the magnet is barely modified, and the entire magnetic flow generated by the magnet can be exploited in the measurements taken.

The assembly can further comprise a measuring device adapted to apply a Fourier transform to the signal of electrical voltage so as to produce a spectrum representative of frequencies of vibrations of the vane.

DESCRIPTION OF FIGURES

Other characteristics, aims and advantages of the invention will emerge from the following description which is purely illustrative and non-limiting and which must be considered with respect to the appended drawings, in which.

In all figures similar elements bear identical reference numerals.

DETAILED DESCRIPTION OF THE INVENTION

Figure 1:
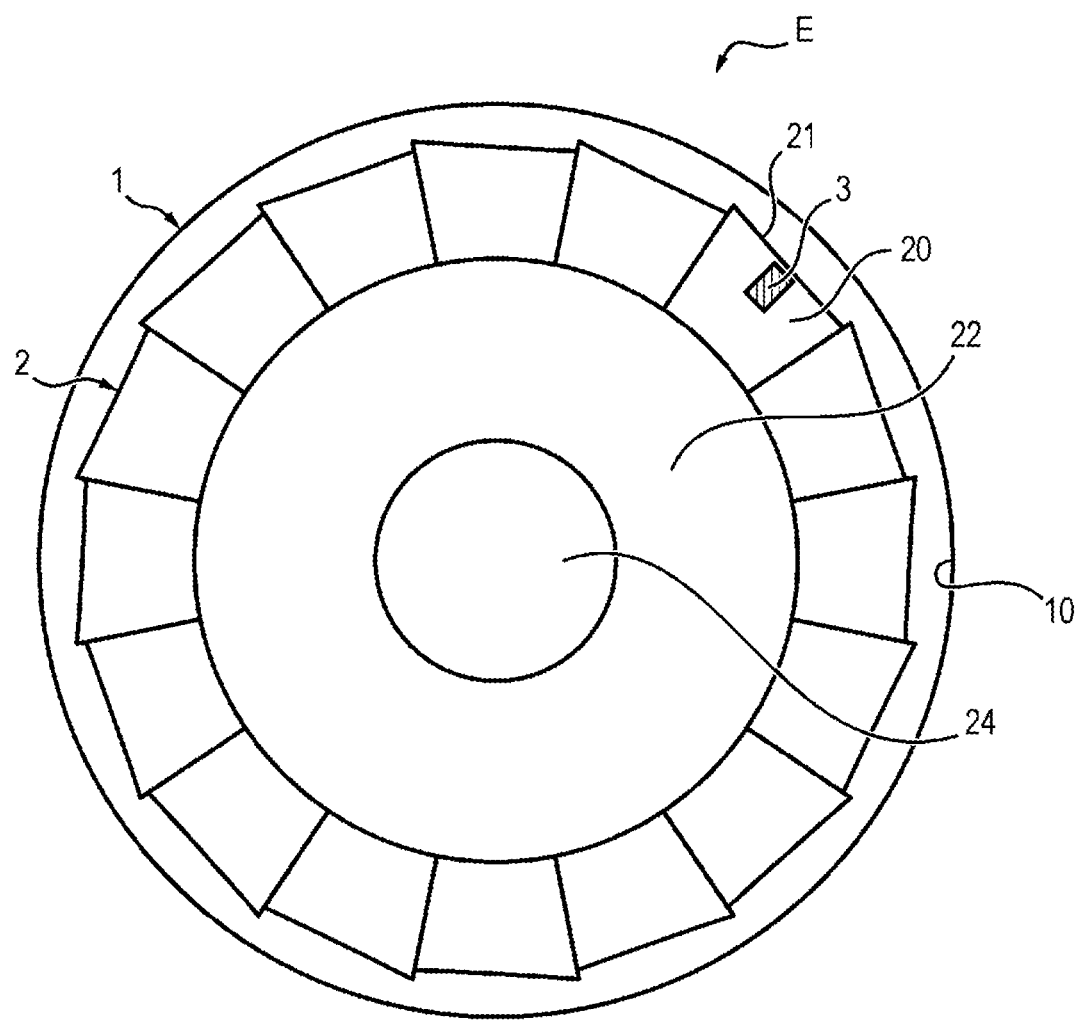
FIG. 1 is a first view in partial section of an assembly for turbine engine according to an embodiment of the invention.

In reference to FIG. 1, an assembly E for turbine engine comprises a casing 1 and an impeller 2 rotatably movable relative to the casing 1. The impeller 1 is here defined by a set of vanes (or blading) distributed over the circumference of a wheel.

The casing 1 has an internal surface 10 defining a space which houses the impeller 2. This internal surface 10 is for example cylindrical.

The impeller 2 is mounted on a motor shaft 24 extending along an axis of rotation (perpendicular to the plane of FIG. 1). The impeller 2 comprises a disc 22 around the shaft 24, and a plurality of vanes. Each vane extends substantially radially from the disc 22 until it terminates by a respective tip. In this way, the tip of each vane is facing a surface portion of the casing 1, irrespective of the angular position occupied by the impeller 2 movable relative to the casing 1.

At least one of the vanes of the impeller, referenced 20, comprises a magnet 3 at its tip 21. The magnet can for example brush the maximal radius of the tip of the vane, relative to the axis of rotation.

The magnet 3 is attached to the vane 20, in turn attached to the disc 22; it is assumed hereinbelow that the movement of the magnet 3 is representative of the movement of the tip 21 of the vane 20.

The topology of the magnetic field created by the magnet 3 is similar to that of a solenoid with several turns: it forms a torus enclosing the magnet 3 and oriented from its north pole to its south pole. The magnet 3 is adapted to generate a magnetic field of radial orientation relative to the axis of rotation of the impeller 2.

Figure 2:
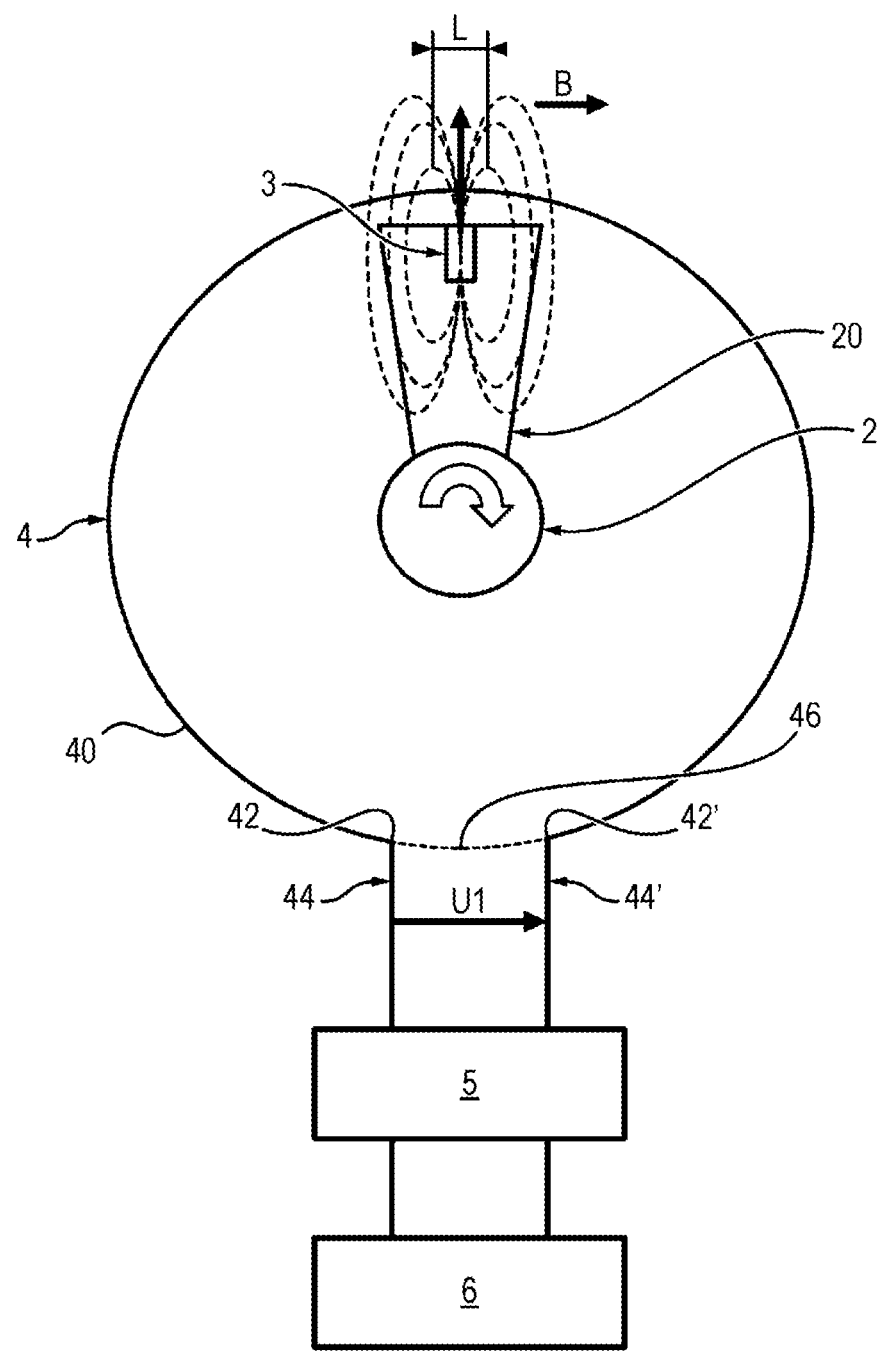
FIG. 2 is a second view in partial section of the assembly of FIG. 1.

In reference to FIG. 2, the casing 1 comprises an electrical conductor 4.

The electrical conductor 4 comprises a so-called "central" part forming a turn or a portion of turn around the axis of rotation of the impeller 2. This central part 40 is for example fixed to the internal surface 10 of the casing 1 facing the impeller 2.

The central part 40 comprises two ends 42, 42' located at different angular positions around the axis of rotation of the impeller 2.

The electrical conductor 4 also comprises two branches 44, 44' each prolonging a respective end of the central part 40.

The central part 40 preferably does not extend over the entire circumference of the casing 1 around the axis of rotation of the impeller 2, but forms an arc of a circle formed by an angular sector of fewer than 360 degrees around the axis of rotation of the impeller. The two ends 42, 42' delimit a portion of circumference of the casing 1 not covered by the central part 40; this non-covered potion is qualified below as "turn opening", referenced 46.

In a variant not illustrated, the central part extends over more than one complete revolution around the axis of rotation of the impeller.

The branches 44, 44' extend in a direction substantially radial to the outside relative to the axis of rotation of the impeller 2 in the casing 1. At the end 42 (respectively 42') which it prolongs, each branch 44 (respectively 44') forms for example with the central part 40, an angle of between 80 degrees and 100 degrees, preferably 90 degrees.

The central part 40 extends over its entire length between the ends 42, 42' in a plane which coincides with a path plane of the magnet 3 during a revolution of the vane 20 around the axis of rotation of the impeller 2.

The branches 44, 44' which prolong this central part 40 can also extend in this same path plane.

When the impeller 2 occupies an angular position such that the magnet 3 is facing a point of the central part 40, the relative vibratory movement of the magnetic field generated by the magnet 3 relative to the central part 40 induces an electric current in a portion of the central part 40 of length L in the vicinity of this point, a current which spreads to the terminals formed by the branches 44, 44'. Voltage U1 is generated between the two terminals of the electrical conductor 4.

In the embodiment illustrated in FIG. 2, the central part 40 of the first electrical conductor 4 defines a portion of a circle centered on a point of the axis of rotation; in this way the airgap between the magnet 3 and any point of the central part 40 is a constant distance. As a variant, the central part can also have other forms than a circular shape or as a portion of a circle.

The terminals of the electrical conductor 4 are connected to the input of a voltage amplifier 5.

The output of the voltage amplifier 5 is connected to a voltage measuring device 6 comprising means for performing spectral analysis of a voltage time signal amplified by the amplifier 5.

General Principle of a Method of Characterizing Vane Vibrations

Figure 3:
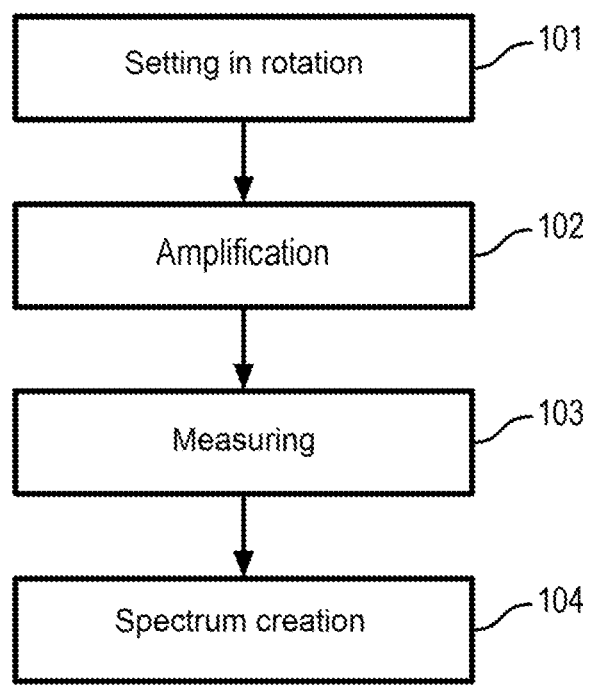
FIG. 3 is a flowchart of steps of a method of characterizing vibrations sustained by a vane, according to an embodiment of the invention.

FIG. 3 shows the steps of a method of characterizing vibrations sustained by the vane 20 comprising the magnet 3.

In a preliminary step 101, the impeller 2 is set in rotation around its axis of rotation. This setting in rotation is likely to generate vibrations of the vane 20.

One period of revolution of the vane 20 around the axis of rotation of the impeller 2 comprises two different phases, each corresponding to a respective range of angular positions of the impeller 2 movable relative to the casing 1: a phase during which the magnet 3 is facing a portion of the central part 40, and a phase during which the magnet 3 is facing the turn opening 46 left between its two ends 42, 42'.

When the magnet 3 is facing a portion of the central part 40, vibratory movement relative to the magnetic field B generated by the magnet 3 relative to the central part 40 causes an electric current in the central part 40, which spreads as far as the terminals formed by the branches 44, 44'. Voltage U1 is generated between the two terminals of the electrical conductor 4.

This voltage U1, generally very low, is amplified by the amplifier 5 during a step 102.

In a step 103, the measuring device 6 acquires from the voltage amplified by the amplifier 5 a voltage time signal of duration greater than the period of revolution of the vane 20 around the axis of rotation.

In a step 104, the device calculates the Fourier transform of the voltage time signal acquired. The result of this transform constitutes a spectrum representative of the vibratory frequencies of the vane 20 in which the magnet 3 is embedded.

As the central part 40 of the conductor extends continuously in the path plane of the magnet, the time signal obtained as the magnet passes along the central part 40 is also continuous. Such a continuous signal is rich in exploitable frequency information after calculation of the Fourier transform.

By comparison, a conductor having a zigzag shape, as per the "tip-timing" method, is not constantly in the path plane of the magnet. A signal acquired by such a zigzag conductor is discontinuous, and accordingly is insufficiently sampled to authorize a Fourier transform of this signal, in light of exploiting the information supplied by the spectrum resulting from this Fourier transform.

The electromagnetic actions of the magnet 3 during these two phases will now be described in more detail.

Electromagnetic Action of the Magnet when it is Facing the Central Part

Figure 4:
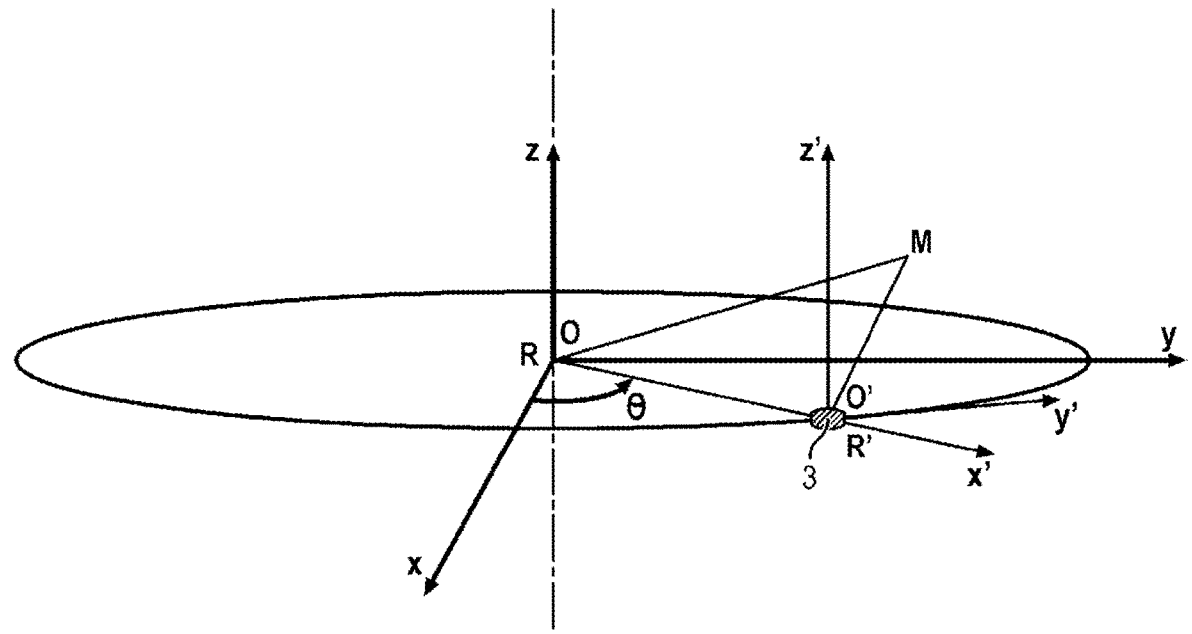
FIG. 4 shows markers associated with different elements of the assembly E shown in FIGS. 1 and 2.

In reference to FIG. 4, a fixed frame R is associated with the casing 1, and a movable frame R' is associated with the magnet 3.

The fixed frame R is defined by a center O, the axis of rotation of the impeller 2, referenced z, and axes x and y defining a plane perpendicular to the motor axis and containing the movement of the magnet 3.

The movable frame R' is defined by a center O' representative of the position of the magnet 3, an axis z' parallel to the axis z, an axis x' supported by the straight OO', and an axis such as the marker R' is a direct trihedral. The movable frame R' forms an angle θ relative to the fixed marker R.

In general, the laws of change of frame from R to R' of a point M in the marker R' impose the following relation:

$$\vec{V}_{M/R} = \vec{V}_{O'/R} + \vec{V}_{M/R'}$$

Figure 5:
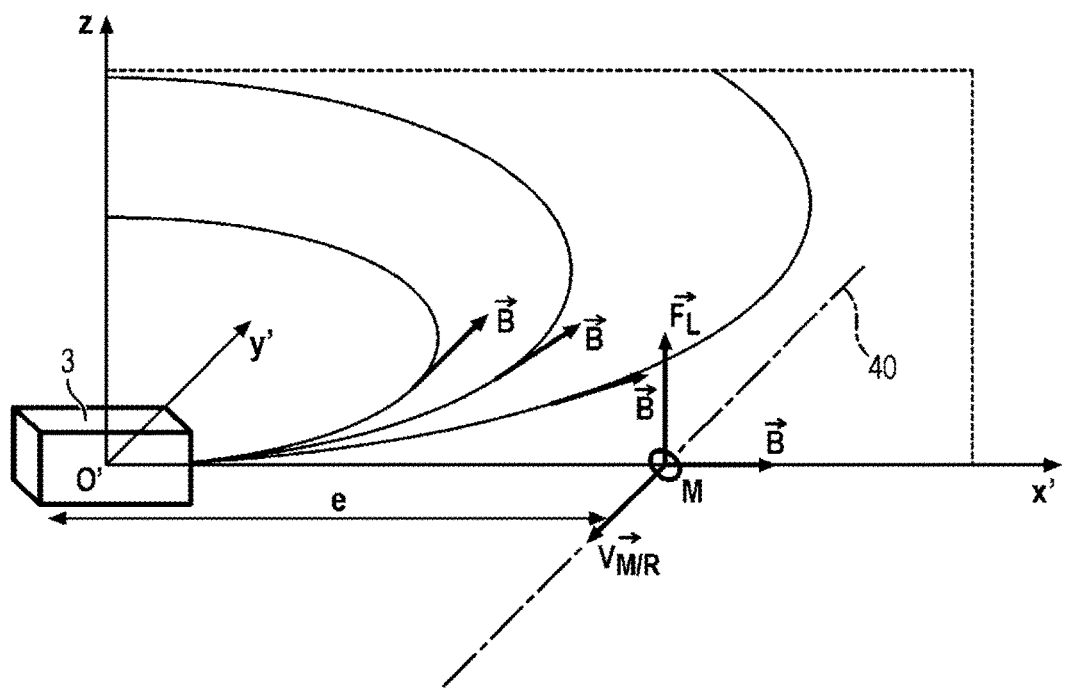
FIG. 5 schematically illustrates electromagnetic interactions between elements of the assembly for turbine engine illustrated in FIGS. 1 and 2.

In reference to FIG. 5, a point of the central part 40 is considered as a point M. This can be shown as:

$$\vec{V}_{O'/R} = -\vec{V}_{M/R'}$$

This relation shows that, equivalently, the magnet 3 at the tip of vane 20 moves relative to the central part 40 fixed in the fixed marker, or that the central part 40 moves relative to the magnet 3 fixed in the movable marker.

Given an electron belonging to the central part 40, immobile in the fixed frame R, its apparent speed in the turning frame R' will be the vector $\vec{V}_{M/R'}$ i.e, the speed which a point of the turning marker in the fixed marker at the distance r+e would have, where e designates the airgap between the magnet 3 and the central part 40 and r the distance OO'.

Given that this point M is completely in the axis of the magnet 3 O'x', the resulting F1 of the Lorentz force to be applied to the electron will be oriented as shown in FIG. 5.

The device in the plane O'x'z can be considered and the components of the field B can be considered only on the components x' and z. The speed of advancement of the electron in the turning frame is that which a fixed point in the turning marker at the distance r+e would have, given the radius r of the blade and the airgap e between the magnet 3 and the abscissa in the turning marker of the point M. The electromotor field can be expressed as follows:

$$\vec{E}_M = \vec{v}_{M/R} \times \vec{B} = \begin{vmatrix} 0 \\ (r+e)\dot{\theta} \\ 0 \end{vmatrix} \times \begin{vmatrix} B_{x'} \\ B_{y'} \\ B_{z'} \end{vmatrix} = \begin{vmatrix} (r+e)\dot{\theta}B_{z'} \\ 0 \\ -(r+e)\dot{\theta}B_{x'} \end{vmatrix} = \begin{vmatrix} E_{x'} \\ E_{y'} \\ E_{z'} \end{vmatrix}$$

When the magnet 3 is subjected to vibrations of the vane 20, the electromotor field generated in this way by the vibratory movement of the vane 20 becomes:

$$\vec{E}_M = \vec{V'} \times \vec{B} = \begin{vmatrix} v_{VIBx} \\ (r+e)\dot{\theta} + v_{VIBy} \\ v_{VIBz} \end{vmatrix} \times \begin{vmatrix} B_{x'} \\ B_{y'} \\ B_{z'} \end{vmatrix} =$$

$$\begin{vmatrix} (r+e)\dot{\theta}B_{z'} + v_{VIBy}B_{z'} - v_{VIBz}B_{y'} \\ v_{VIBz}B_{x'} - v_{VIBx}B_{z'} \\ v_{VIBx}B_{y'} - (r+e)\dot{\theta}B_{x'} - v_{VIBy}B_{x'} \end{vmatrix} = \begin{vmatrix} E_{Mx'} \\ E_{My'} \\ E_{Mz'} \end{vmatrix}$$

where:

$$\overrightarrow{V_{M/R'}} + \overrightarrow{V_{M/R'}} = \overrightarrow{V'}$$

A current induced in the central part 40 is measurable when the electromotor field will be oriented according to the component y, i.e., in the axis of the conductor. A measurable component will therefore be:

$$\overrightarrow{E_{Mutile}} = (Vvibz \cdot B_{x'} - Vvibx \cdot B_{z'})\vec{e'}_y$$

Besides, if the hypothesis is made that the magnet 3 is contained in the plane of the central part 40, this component is rewritten as:

$$\overrightarrow{E_{Mutile}} = (Vvibz \cdot B_{x'})\vec{e'}_y$$

As a consequence, in the event where the magnet 3 is in the plane of the central part 40, only vibratory behavior along the axis z (axis of rotation) will result in measurable induced currents. In the absence of vibratory activity there will therefore not be a measurable signal.

The instantaneous voltage U1 measured at the terminals of the electrical conductor 4 while a segment AB is present in the field of influence of the magnet 3 is expressed in the following form:

$$U_1 = \int_A^B \vec{E}_m \cdot \vec{dl} = \int_A^B V_{VIBz} B_{x'} \vec{e}_\theta \cdot \vec{dl} = V_{VIBz} B_{x'} l_{AB}$$

where $l_{AB}$ designates the length of the segment AB subject to the influence of the magnet 3, $B_{x'}$ is the radial component of the magnetic field generated by the magnet 3, and Vvibz is the vibratory speed component of the magnet 3 along the axis x.

Electromagnetic Action of the Magnet when it is Facing the Turn Opening

When the magnet 3 is facing the turn opening 46 the electrical conductor 4 escapes the influence of the magnetic field B of the magnet 3, a phenomenon which naturally generates induced currents.

As this turn opening 46 is made along the axis x', only the component x' of the electromotor field generates voltage in the output branches 44, 44' of the central part 40.

The electromotor field generated in the output branches 44, 44' of the central part 40 is proportional both to the rotation speed of the rotor and also to the component of the magnetic field.

The passing of the instrumented vane 20 in front of this turn opening 46 causes what is called a "turn peak" in the voltage time signal measured by the measuring device 6 such as that shown in FIG. 6. The turn opening 46 therefore enables formation of such turn peaks.

The turn peaks consist of information of interest in the time signal voltage measured by the measuring device 6. In fact, they can serve as time reference for measuring the rotation speed of the impeller 2 around its axis. They are also representative of the sensitivity of measurements taken.

But these turn peaks introduce harmonics which can impair interpretation of the voltage time signal or the corresponding spectrum prepared by the measuring device 6.

It can therefore prove interesting to minimize the presence of these peaks in the voltage time signal.

The temporal extent of the turn peaks can be minimized by reducing the size of the turn opening 46: for example, distant ends 42, 42' of an arc formed by an angular sector around the axis of rotation of the impeller of fewer than 20 degrees, or even fewer than 10 degrees can be provided. Minimizing the turn opening maximizes the time during which the central part 40 will be sensitive to the vibrations of the impeller 20.

The turn peaks can further be minimized by orienting each branch of the electrical conductor 4 at an angle between 80 and 100 degrees, preferably 90 degrees, relative to the end of the central part 40 which this branch prolongs. This orientation of angle further makes for easy integration of the branches in the casing 1.

Time Analysis

The time signal in voltage s(t) recorded at the terminals of the central part 40 is the direct image of the vibratory speed component of the vane 20 parallel to the axis of rotation z' of the impeller 2.

In an ideal situation in which the vane 20 sustains no vibration, the resulting signal s(t) can be seen as the repetition of a pattern m(t) depending on the speed motor. This signal can be seen as the convolution of this pattern m(t) with a Dirac comb $\delta_{Tr}(t)$ having as period Tr the period of revolution of the magnet 3 around the axis of rotation of the impeller 2.

$$s(t) = m(t) * \delta_{Tr}(t)$$

Figure 6A:
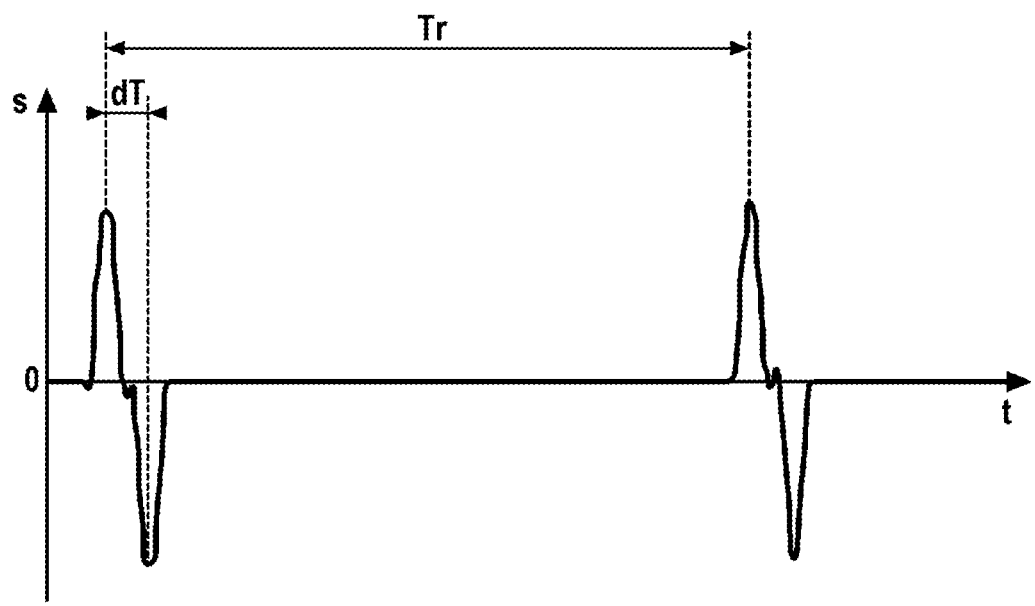
FIGS. 6a to 6c each illustrate a voltage time signal obtained during execution of the method of FIG. 3.

FIG. 6a shows a signal s(t) corresponding to such an ideal situation and comprising two turn peaks of duration dT.

Figure 6B:
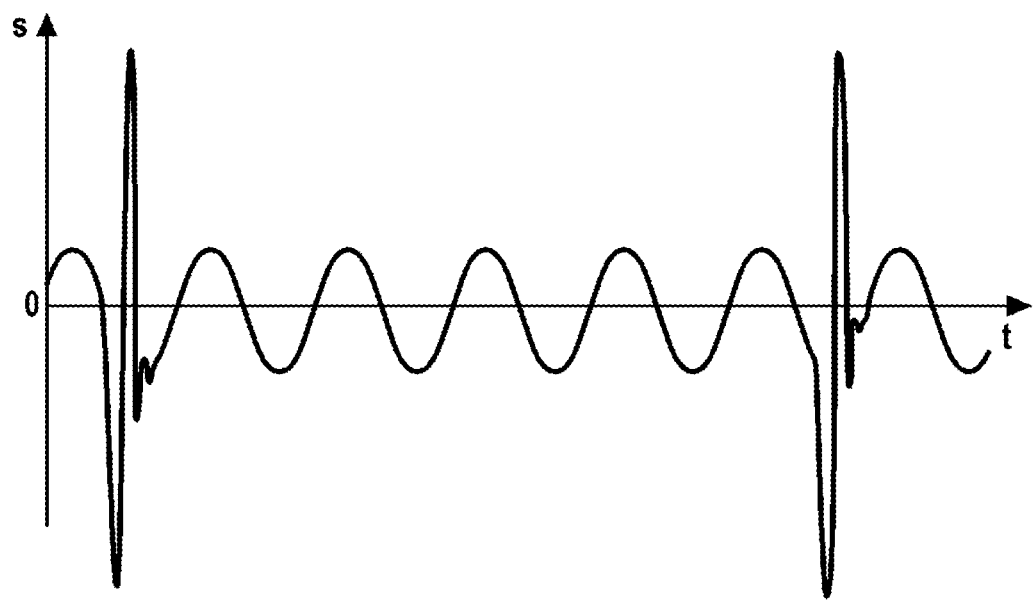

In a real situation during which the magnet 3 is subjected to vibratory movement of the tip 21 of the vane 20, the voltage time signal becomes:

$$s(t) = m(t) * \delta_{Tr}(t) + s_v(t)$$

where $s_v(t)$ is a vibratory component. An example of such a signal is shown in FIG. 6b. During rotation, if the blade is animated by vibratory movement comprising an axial component at the magnet 3, the movement vibratory induces voltage (for minor shifts) proportional to its axial speed.

Figure 6C:
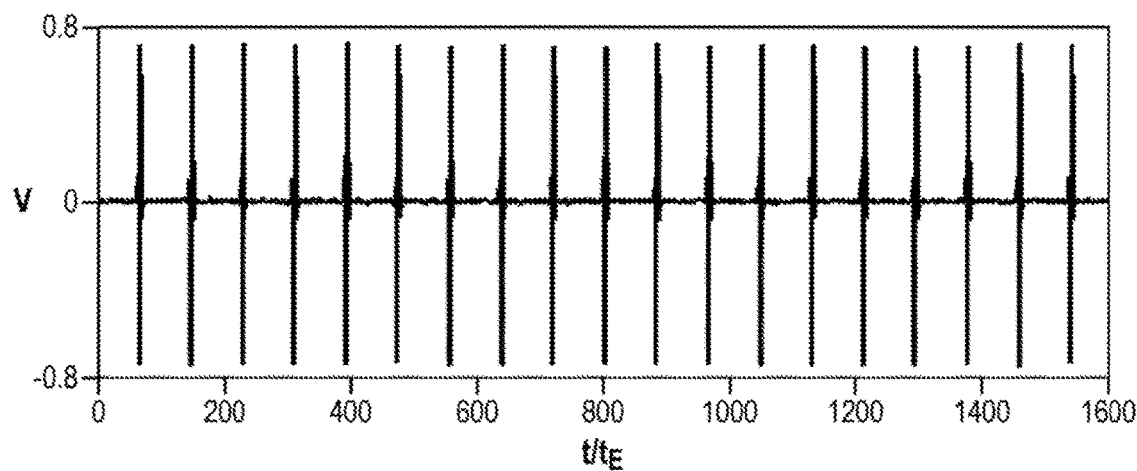

FIG. 6c also shows a voltage time signal over a period longer than the period of revolution of the vane; a plurality of turn peaks is accordingly present in this signal.

Spectral Analysis

Figure 7:
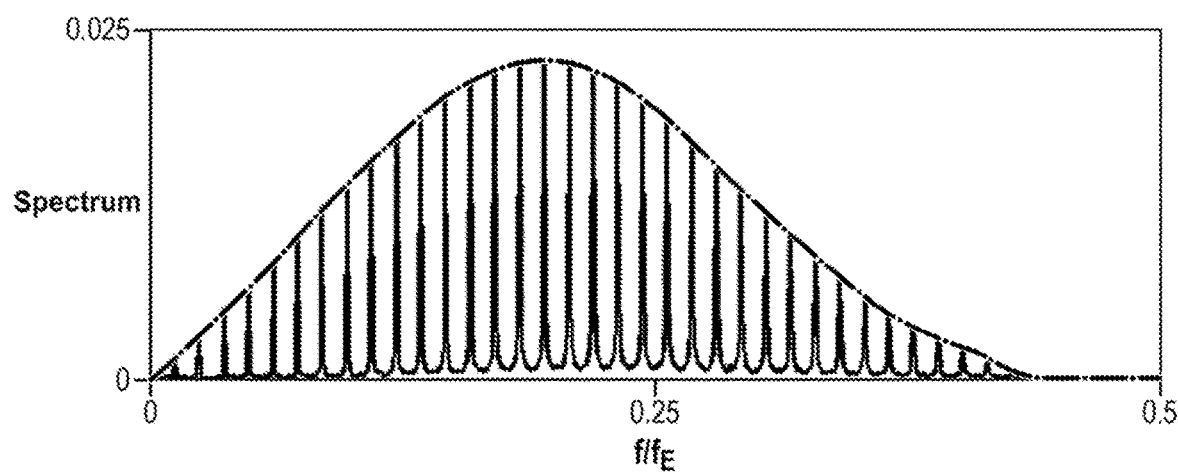
FIG. 7 shows a spectrum corresponding to the signal shown in FIG. 6c.

A spectrum S(f) corresponding to the signal s(t), obtained during step 104 and also shown in FIG. 7, is expressed in the form:

$$S(f) = M(f)\delta_{Fr}(f) + Sv(f)$$

where M(f) is the spectrum of the pattern m(t) and Sv(f) the spectrum of the vibratory signal sv(t) and Fr is the frequency of rotation of the impeller 2 corresponding to the period Tr.

It is therefore clear that the frequency representation of the signal measured at the terminals of the electrical conductor 4 will be composed of the spectrum of the vibratory component, an additive term corresponding to the set of patterns. This latter term will be a Dirac comb at the frequency Fr, modulated by the spectrum of the pattern m(t).

Signature analysis of turbines is generally done as a function of the speeds of the different mobile generators (NG) or free turbines. In fact these mobiles constitute the main sources of excitations in a turbine engine, which is why the evolution of the spectral content is shown as a function of the excitation speed. An excitation frequency fexc such as fexc=speed/60 is associated with a speed of a mobile.

The variation of the spectral content of the signal S(f) can therefore be represented as a function of the speed of the impeller 2. For this, the measuring step 103 is repeated, each measurement starting when a triggering condition is predetermined. The different time signals acquired each correspond to a respective observation window of the same duration or time width.

The acquisition of each time window is achieved for example as a function of a condition of variation of the speed. Each time the condition will be respected the acquisition of an observation window will be made, as will the calculation of a corresponding spectrum (step 104).

The start of acquisition can typically be initiated each time the speed rises by a pitch of predetermined speed, for example 60 rpm, or else periodically.

The time windows can be temporally contiguous or else non-contiguous. In practice observation windows are advantageously contiguous so as to be sure of temporally following the evolution of the spectrum. The width of each window is controlled at the same time as a function of a preferred frequency resolution and a "refreshment" rate of the spectrum.

Each spectrum can be determined from a respective time signal, as seen previously, or else as a variant, from an average of N time signals acquisition of which is triggered successively.

In any case, repetition of steps 103 and 104 produces a plurality of spectra which can be combined so as to work out different types of diagrams of interest known to those skilled in the art such as a time-frequency diagram or a Campbell diagram.

A time-frequency diagram for displaying the evolution of the spectrum associated with the vibrations of the tip 21 as a function of time (the Fourier transform performed is a short-time Fourier transform). In this case, partially covering observation windows are advantageous as they improve the time and frequency resolution of such a time-frequency diagram.

A Campbell diagram displays the evolution of the spectrum associated with the vibrations of the tip 21 as a function of the motor speed.

The consequences of frequency analysis of the signal of the spectrum worked out in this way are of several orders:
  The whole motor orders is clearly materialized on the spectrum by the Dirac comb whereof the frequency is synchronous to the speed.
  The amplitude of the different motor orders will be modulated in frequency by the spectrum of the turn pattern, which will decrease the amplitudes of the peaks near the limits of the analysis band.
  The terms corresponding to the motor orders and the useful signal are additive, which better reveals the resonance phenomena of any vanes, whereas each resonance identified between a vane mode 2 and a motor order will be the sum of these two contributions (and therefore not representative of the vibratory amplitude of the vane).

The formulated spectra can form the object of other processing in the frequency domain. For carrying out such processing, those skilled in the art could refer to the work by M. Kay called "Modern Spectral Estimation".

Materials

The electrical conductor 4 can be positioned directly on the internal surface 10 of the casing 1, facing the impeller 2.

As a variant, the conductor can be positioned inside the casing 1, but ensuring that any portion of material of the casing 1 located between the electrical conductor 4 and the magnet 3 promotes good transmission of the magnetic field generated by the magnet 3 to a portion of the electrical conductor 4. It could be ensured that said portion of material is made of paramagnetic and diamagnetic material, as these materials in fact have magnetic permeability values close to 1. So since the magnetic flow of the magnet 3 would be slightly modified, the whole magnetic flow generated by the magnet 3 could therefore be exploited in the measurements taken.

The electrical conductor 4 is for example embedded all or part in an abradable deposit located on the internal surface 10 of the casing 1 facing the impeller 2, the abradable deposit being made of such paramagnetic or diamagnetic material.

The magnet 3 can further comprise aluminium-nickel-cobalt (AlNiCo) with a Curie point between 800° C. and 850° C. (the Curie point being the temperature at which the material loses its spontaneous magnetization).

The amplifier 5 can be an amplifier of constant current type, advantageously applying gains of up to 3000. It is possible to boost the voltage at the terminals of the electrical conductor 4 to produce measurable voltage of the order of a millivolt.

The assembly E for turbine engine described can be applied to any type of impeller rotatably movable in a fixed structure similar to a casing: axial wheels, centrifugal impellers, high-pressure turbines, free turbines, etc.

A turbine engine comprising such an assembly E can also be embedded in any type of vehicle, especially an aircraft.

The invention claimed is:

1. An assembly for turbine engine, the assembly comprising: a casing; and an impeller rotatably movable in the casing, the impeller comprising at least one vane having a tip facing the casing, the tip including a magnet, wherein the casing comprises an electrical conductor adapted to generate between terminals thereof an electrical voltage signal induced by the magnet of the tip and representative of vibrations sustained by the tip of the vane when the impeller is set in rotation, wherein the electrical conductor comprises: a central part having first and second opposite ends, and first and second branches forming the terminals of the electrical conductor, the first branch extending from the first end of the central part, and the second branch extending from the second end of the central part, wherein the central part extends over an entire length thereof from the first end to the second end in a plane which coincides with a path plane of the magnet around an axis of rotation of the impeller, and wherein the electrical conductor is embedded at least partially in an abradable deposit located on an internal surface of the casing facing the impeller, the abradable deposit being made of diamagnetic material.

2. The assembly according to claim 1, wherein the first and second ends of the central part are located at different angular positions around the axis of rotation of the impeller.

3. The assembly according to claim 1, wherein the central part extends over fewer than 360 degrees around the axis of rotation of the impeller.

4. The assembly according to claim 2, wherein the central part has a circular shape centered on the axis of rotation of the impeller.

5. The assembly according to claim 2, wherein the first and second branches respectively extend from the first and second ends of the central part radially to an outside relative to the axis of rotation of the impeller, the central part and the first and second branches being coplanar.

6. The assembly according to claim 1, wherein the magnet is adapted to emit a magnetic field radially oriented relative to the axis of rotation of the impeller.

7. The assembly according to claim 1, further comprising a voltage amplifier connected to the terminals of the electrical conductor.

8. The assembly according to claim 1, further comprising a measuring device adapted to apply a Fourier transform to the electrical voltage signal so as to produce a spectrum representative of frequencies of vibrations of the vane.

9. A method of characterizing vibrations of a vane of an assembly for turbine engine according to claim 1, the method comprising:

setting in rotation of the impeller in the casing, measuring at the terminals of the electrical conductor of an electrical voltage signal induced by the magnet contained in the tip of the vane facing the casing, determining information representative of the vibrations sustained by the tip of the vane from the measured electrical voltage.

10. The method according to claim 9, wherein the measuring, conducted continuously for at least one revolution of the vane, provides a voltage time signal, and the determining comprises a Fourier transform of said time signal in a spectrum representative of frequencies of vibrations of the vane.

11. The method according to claim 9, further comprising amplifying the electrical voltage signal induced by the magnet, performed before the measuring.

12. The assembly according to claim 1, wherein the magnet comprises aluminum-nickel-cobalt with a Curie point between 800° C. and 850° C.

* * * * *